(12) United States Patent
Bran

(10) Patent No.: US 10,051,460 B2
(45) Date of Patent: Aug. 14, 2018

(54) SUBSCRIPTION-ENABLED AUDIO DEVICE AND SUBSCRIPTION SYSTEM

(71) Applicant: Plantronics, Inc., Santa Cruz, CA (US)

(72) Inventor: Cary Bran, Seattle, WA (US)

(73) Assignee: Plantronics, Inc., Santa Cruz, CA (US)

(*) Notice: Subject to any disclaimer, the term of this patent is extended or adjusted under 35 U.S.C. 154(b) by 0 days.

(21) Appl. No.: 15/382,498

(22) Filed: Dec. 16, 2016

(65) Prior Publication Data

US 2018/0176766 A1    Jun. 21, 2018

(51) Int. Cl.
| | | |
|---|---|---|
| *H04W 8/18* | (2009.01) | |
| *H04W 12/06* | (2009.01) | |
| *H04W 88/02* | (2009.01) | |
| *H04W 4/00* | (2018.01) | |
| *H04W 72/04* | (2009.01) | |
| *H04W 8/20* | (2009.01) | |
| *H04W 4/80* | (2018.01) | |
| *H04W 84/12* | (2009.01) | |

(52) U.S. Cl.
CPC .......... *H04W 8/183* (2013.01); *H04W 4/008* (2013.01); *H04W 4/80* (2018.02); *H04W 8/205* (2013.01); *H04W 72/0446* (2013.01); *H04W 12/06* (2013.01); *H04W 84/12* (2013.01)

(58) Field of Classification Search
CPC .......... H04W 4/00; H04W 4/06; H04W 8/18; H04W 8/183; H04W 12/00; H04W 12/06; H04W 12/08; H04W 88/02; H04W 92/00
USPC ....... 455/3.01, 3.02, 3.03, 3.04, 3.06, 414.1, 455/411, 418–420
See application file for complete search history.

(56) References Cited

U.S. PATENT DOCUMENTS

| | | | | |
|---|---|---|---|---|
| 5,864,757 | A * | 1/1999 | Parker | H04W 8/265 340/5.54 |
| 6,529,727 | B1 * | 3/2003 | Findikli | H04W 8/265 455/411 |
| 6,542,730 | B1 | 4/2003 | Hosain | |
| 8,150,431 | B2 * | 4/2012 | Wolovitz | G06Q 10/107 455/412.1 |
| 8,438,659 | B2 | 5/2013 | Shen | |
| 2006/0240811 | A1 * | 10/2006 | De Luca | H04W 8/18 455/414.3 |
| 2007/0058832 | A1 * | 3/2007 | Hug | G06F 17/30017 381/388 |
| 2014/0002357 | A1 | 1/2014 | Pombo et al. | |
| 2016/0357512 | A1 * | 12/2016 | Reimann | G06F 17/30761 |

* cited by examiner

*Primary Examiner* — Philip Sobutka
(74) *Attorney, Agent, or Firm* — Thomas S. Dienwiebel; Slayden Grubert Beard PLLC

(57) ABSTRACT

A subscription-enabled audio device is provided, which comprises at least a speaker for providing an application audio output; a subscription verification module, allowing to determine a subscription state indicator; and an audio processor for controlling the speaker. To provide an enhanced audio device that is particularly suitable for Device-as-a-Service application, the audio processor is configured to query the subscription verification module to obtain the subscription state indicator and to provide a subscription state audio output in addition to said application audio output to the speaker in case the subscription state indicator corresponds to an unsubscribed state.

22 Claims, 12 Drawing Sheets

US 10,051,460 B2

SUBSCRIPTION-ENABLED AUDIO DEVICE AND SUBSCRIPTION SYSTEM

TECHNICAL FIELD

The present invention relates to the field of audio devices and in particular to headsets and headphones.

BACKGROUND

In recent years, service models became common within the fields of telecommunication and computing. Many products in the aforesaid technical fields are available on a purchase basis, but also now are available on the basis of a rental-like agreement. A well-known example of the latter case in the field of computing is the subscription of a software product, which typically is referred to as "Software-as-a-Service"—commonly abbreviated as "SaaS".

In addition to the above example of "Software-as-a-Service", an increasing number of hardware manufacturers provide a similar type of service for electronic devices, such as computers, computer peripherals, and other electronics. This type of service is also referred to as "Device-as-a-Service (DaaS)" and is mostly used by businesses in view of the flexibility, scalability, and the fact that unlike a typically purchase, no capital investment is necessary.

In both cases, SaaS and DaaS, the service subscriber typically pays a recurrent subscription fee, such as a monthly fee. When the subscriber cancels the service, the service provider terminates the respective service.

In case of Software-as-a-Service, the service provider upon termination of the subscription blocks access to the respective software by the former subscriber. This is possible since in most instances, the software is provided as a "cloud service", i.e., residing on a computing system that is under control of the service provider.

In the other mentioned example of Device-as-a-Service, blocking access of the former subscriber to the respective device is more difficult since the device typically is in the possession of the subscriber.

While in most cases of an amicable termination, the former subscriber may return the device, it is possible that the former subscriber does not return the device.

This problem rendered it difficult to extend the Device-as-a-Service model to a variety of technologies, for example to the field of audio electronics. While it would be desirable to provide audio devices, such as in particular headsets, on a Device-as-a-Service basis, the present inventor has ascertained that a particular problem resides in the fact that audio devices used in telecommunications must remain functional to allow, e.g., emergency calls.

Accordingly, an object exists to provide an enhanced audio device that is particularly suitable for Device-as-a-Service applications.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a subscription-enabled audio device is provided, which audio device comprises at least a speaker for providing an application audio output, a subscription verification module, allowing to determine a subscription state indicator, and an audio processor for controlling the speaker. According to the present aspect, the audio processor is configured to query the subscription verification module to obtain the subscription state indicator and to provide a subscription state audio output in addition to said application audio output to the speaker in case the subscription state indicator corresponds to an unsubscribed state.

A basic idea of the invention is to provide awareness that the audio device is not currently subscribed by providing additional audio to the user in this case. Unlike the aforementioned SaaS example, the audio device thus remains mainly functional, even when no current subscription is present, however, it will be obvious to the user when the audio device is not under a current subscription.

This aspect and other aspects of the invention will be apparent from and elucidated with reference to the embodiments described hereinafter.

DETAILED DESCRIPTION OF PREFERRED EMBODIMENTS

Figure 1:
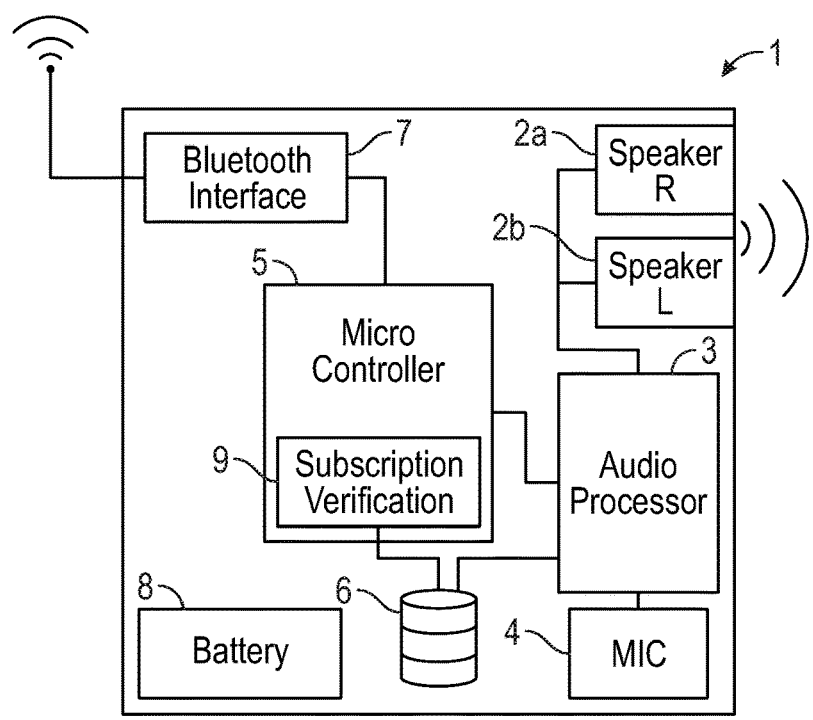
FIG. 1 shows a schematic block diagram of an embodiment of a subscription-enabled audio device.

Technical features described in this application can be used to construct various embodiments of audio devices, subscription systems, and methods of subscription management according to the preceding and following description. Some embodiments of the invention are discussed so as to enable one skilled in the art to make and use the invention.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a connection may be provided over a WAN (wide area network), LAN (local area network), PAN (personal area network), comprising, e.g., the Internet, Ethernet networks, cellular networks, Bluetooth networks, ZigBee networks, and/or Wi-Fi networks using a corresponding suitable communications protocol. In some embodiments of a wireless audio device, a Bluetooth (low energy) connection, a DECT connection, or an NFMI connection is used to transmit audio to the device and/or to transmit data.

According to a first exemplary aspect, a subscription-enabled audio device is provided, comprising at least a speaker, a subscription verification module, and an audio processor.

In the context of the present invention, the term audio device is understood to refer to any type of device, capable of at least providing an audio output to one or more users during operation.

For example, the audio device may be a headphone (audio output only), a headset (audio output and audio input), a loudspeaker system, a speakerphone, a PA (public address) device/system, an in-room audio system with microphone (audio output and audio input) or without microphone (audio output only), for example a sound masking or "soundscaping" system. Further examples include, without limitation, hearing assisting devices, such as hearing aids, amplified headsets, and amplified headphones, and/or television listeners. Certainly, the invention is not limited to the aforementioned examples. The audio device may be of mono, stereo, or multichannel (more than two channels) type.

In line with the above, the at least one speaker of the audio device according to the present aspect may be of any suitable type and may, e.g., comprise one or more electroacoustic transducers. In corresponding embodiments, the speaker may be adapted to the respective application. The at least one speaker may be of dynamic type, piezoelectric type, magnetostatic type, magnetostrictive type, electrostatic type, MEMS type, or any other suitable type.

The speaker provides an application audio output, i.e., provides an acoustically perceivable output during operation, for example to one or more users. In some embodiments, the application audio output may comprise sound, voice and/or music, depending on the respective application.

It should be noted that in according exemplary embodiments, more than one speaker may be provided, such as in stereo, multi-channel, or surround sound applications. In such cases, the speakers may be arranged to provide the same application audio output or to provide separate channels (multi-channel audio) of the application audio output.

The subscription verification module according to the present aspect allows to determine a subscription state indicator. The subscription verification module may be of any suitable type and may be active or passive. In the latter passive case, the subscription verification module may in an embodiment provide storage for the subscription state indicator.

In another alternative or additional embodiment, the subscription verification module is formed separately from the further components of the audio device. In an alternative embodiment, the subscription verification module is formed integrally with one or more further components of the audio device. In another alternative or additional embodiment, at least a part of the functionality of the subscription verification module is provided in software that can be loaded in and executed by a (micro)processor to provide the functionality discussed herein.

The subscription state indicator according to the present aspect allows the determination of at least two states, namely a subscribed state and an unsubscribed state. In one example, the subscription state indicator is digital and of one-bit type. Certainly, the subscription state indicator may allow for further states and may comprise additional information, such as for example an expiration date of the subscription, a "time left" indication until expiration, a "disable premium feature indicator", and/or time between repeated subscription state audio outputs. In such case, the subscription state indicator may be of nibble or byte type with a corresponding bitmask to provide the additional information. For example, the "disable premium feature indicator" may comprise information about features to disable, e.g., in Bluetooth, profiles comprising the advanced audio distribution profile (A2DP) may be disabled in the unsubscribed state, so that the user cannot stream music without subscription, but a hands-free profile (HFP) may remain enabled so as to allow continued use of communication features.

According to the present aspect, the subscription-enabled audio device further comprises an audio processor, which is at least configured to control the aforementioned speaker so that the application audio output can be provided by the speaker to the one or more users. The audio processor is further configured to query the subscription verification module to obtain the subscription state indicator and to provide a subscription state audio output in addition to the application audio output in case the subscription state indicator corresponds to an unsubscribed state, e.g., by multiplexing the application audio output and the subscription state audio output.

In other words, the subscription state audio output is provided in addition to the application audio output when the subscription-enabled audio device is not currently subscribed. The subscription state audio output in one embodiment serves to make the user aware of the fact that his or her subscription has terminated so that the user can take appropriate steps, such as to renew his or her subscription. While in this embodiment, the subscription state audio output provides a reminder to the user to renew the subscription, the main functionality of the audio device, i.e., providing the application audio output, remains enabled. This is particularly useful in telecommunications applications, e.g., to allow emergency calls.

The audio processor may be of any suitable type to allow the speaker to provide the application audio output and, in case the audio device is not in a subscribed state, the subscription state audio output. For example, the audio processor may comprise one or more digital signal processors (DSP).

The audio processor in one embodiment comprises a driver circuit to operate the speaker(s) from a received audio output signal or stream. The audio processor in another alternative or additional embodiment may comprise one or more of an audio amplifier circuit, signal processor, digital-to-analog (D/A) converter, and a power source. In another alternative or additional embodiment, the audio processor is configured to obtain user input audio, such as from one or more microphones, and to transmit a corresponding audio input signal or stream.

In one embodiment, the audio processor is formed separately from the other components of the audio device. In another embodiment, the audio processor is formed integrally with one or more other components of the audio device.

The subscription state audio output according to the present aspect may be of any suitable type so that when enabled, an acoustically perceivable output is provided, for example to one or more users of the respective audio device. In according embodiments, the subscription state audio output may be of continuous or discontinuous type. In the latter case, the subscription state audio may be provided as a one-time audio output or may be provided recurrently. The subscription state audio output may in according embodiments comprise sound, voice, and/or music. In another alternative or additional embodiment, the subscription state audio output has a volume to be easily perceivable, i.e., that provides that it is readily apparent to the user that the device is in a state, requiring attention or action. In a further additional or alternative embodiment, the subscription state audio output has a volume difference to the application audio output, so that the latter remains perceivable.

As discussed in the preceding, the subscription state audio output in one embodiment serves to make the user aware of the fact that his or her subscription has terminated, e.g., expired or cancelled.

Additionally, and in an embodiment, the audio device may comprise a haptic feedback unit, configured to provide haptic feedback in case of the subscription state indicator corresponding to the unsubscribed state. A haptic feedback may emphasize that the audio device is in a state, requiring attention. For example, the haptic feedback unit may comprise a vibration motor that is activated in the unsubscribed state.

In another embodiment, the subscription verification module comprises a timer, which allows to determine a predefined subscription expiration time. Such predefined subscription expiration time may for example be factory-set. According to the present embodiment, the subscription verification module is configured to automatically set the subscription state indicator to the unsubscribed state in case the predefined subscription expiration time is given. The present embodiment allows independent operation.

According to another embodiment, the subscription-enabled audio device further comprises a communication interface, which is connected at least with the subscription verification module. The communication interface is further configured for communication with a subscription service device and, e.g., other devices.

The communication interface may be of any suitable type for communication with the subscription service device over a wired and/or wireless communication medium. For example, the communication interface may be adapted for communication using the Internet Protocol over a WAN, LAN, cellular connection, Bluetooth connection, and/or Wi-Fi Network. Certainly, the communication interface may be adapted for further communication methods and protocols, such as Bluetooth, Bluetooth Low Energy, DECT, Near Field Communication, IR-Transmission, ZigBee, or any other suitable method and protocol.

According to the present embodiment, the subscription service device is provided external to the audio device. The subscription service device may be provided in physical proximity to the audio device or provided as a "cloud-based" device, i.e., remote from the audio device.

The subscription service device in one embodiment provides subscription information to the subscription verification module. In a further additional or alternative embodiment, the subscription service device is a subscription server system, providing subscription information to a plurality of subscription-enabled audio devices and their respective subscription verification modules.

In the context of the present invention, the aforementioned subscription information is understood to comprise information about the subscription of the respective audio device. For example, the subscription information may allow to determine a subscribed/unsubscribed state of the audio device, the expiration date and/or expiration time of the subscription, and/or the time until the subscription expires.

Certainly, the subscription information may in an according embodiment comprise additional information, such as a device ID, a subscription ID, one or more additional subscription functionalities, e.g., for premium features, predefined device settings, audio settings, such as audio signal tuning, e.g., for users with hearing impairments, and/or an encryption key. Certainly, further examples are conceivable in dependence of the respective application of the audio device. In one additional embodiment, the subscription information is encrypted and/or cryptographically signed to enhance the security of the device and system.

In one embodiment, the audio processor is configured not to provide the subscription state audio output to the speaker in case the subscription state indicator corresponds to a subscribed state.

According to a further embodiment, the audio processor is configured to repeat the subscription state audio output until the subscription state indicator corresponds to a subscribed state. In another embodiment, the subscription state audio output is repeated in intervals, e.g., periodic intervals.

In a further embodiment, volume and/or frequency of the subscription state audio output is increased with time from the termination of the subscription, e.g., according to a linear or exponential function, up to an upper volume and/or frequency limit for safety reasons. In this embodiment, the audio processor in a further additional embodiment may comprise a timer, which is triggered by the time of termination of the subscription.

According to another embodiment, the subscription state audio output is a voice prompt. For example, the voice prompt may read "Subscription expired. Please renew your subscription.". According to a further example, the voice prompt may inform the user that the headset is out of commission and only usable for emergency communications.

The voice prompt may be stored in a suitable memory unit, formed integrally with the audio processor or external thereof.

As discussed in the preceding, the application audio output in according embodiments may comprise sound, voice, and/or music, depending on the respective application.

In one embodiment, the application audio output is generated internally by the subscription-enabled audio device, e.g., by the audio processor. In another embodiment, the application audio output is provided from a recording that is stored in the above-mentioned memory device. In another embodiment, the application audio output is provided from a digital or analog audio signal, received at a corresponding "audio-in" port of the audio device. The audio-in port may be configured for wired (conductor based) or wireless reception of the audio signal.

In a further embodiment, the communication interface is additionally configured to receive application audio data and to provide the application audio data to the audio processor for generating the application audio output therefrom.

The present embodiment allows to receive application audio data from a (remote) audio source, which may be any suitable device, such as a computer, phone, smart phone, tablet, smart watch, music player, mobile gaming device, digital media player, video game console system, streaming server, or a cloud service.

The term "audio data" in the present context refers to an analogue or digital representation of audio. For example, the audio data described herein may be of pulse code modulated (PCM) type, or any other type of bit stream signal. The audio data may comprise one channel (mono signal), two channels (stereo signal), or more than two channels (multichannel signal).

According to another embodiment, the audio device further comprises a user audio input to obtain user audio. The user audio input may be of any suitable type. For example, the user audio input may comprise one or more microphones or allow connection of one or more microphones. In one additional embodiment, the audio processor is connected with the user audio input and being configured to provide user audio data, corresponding to the user audio, to the communication interface for transmission to, e.g., an audio receiver. In some examples, the audio receiver may correspond to the audio source, discussed in the preceding, although it should be noted that this does not necessarily need to be the case.

According to a further embodiment, the audio processor is configured to provide user audio data to the communication interface for transmission, wherein in case the subscription state indicator corresponds to the unsubscribed state, the audio processor is configured to generate the user audio data from the user audio and the subscription state audio output, e.g. by multiplexing the user audio and the subscription state audio output. The present embodiment provides, e.g., that the subscription state audio output is also provided to the audio receiver as a further reminder to renew the subscription soon.

As discussed in the preceding, the subscription service device in one embodiment provides subscription information to the subscription verification module, i.e., information about the subscription of the respective audio device.

According to another additional or alternative embodiment, the subscription verification module is configured to receive subscription information from the subscription service device and to set the subscription state indicator corresponding to the received subscription information. The present embodiment may, e.g., be useful in case the subscription information provides information on the subscription state of the audio device, i.e., "subscribed" or "unsubscribed". The subscription verification module in one example may be configured to receive subscription information from the subscription service device upon a change in the subscription state. In another example, the subscription information is transmitted between subscription service device and subscription verification module according to a predefined schedule, e.g., every 24 hours.

In a further additional or alternative embodiment, the subscription verification module is configured to set the subscription state indicator to the unsubscribed state in case subscription information is not received from the subscription service device within a predefined connection timeout interval. The present embodiment reduces inaccuracies in the subscription state indicator in cases where the connectivity between audio device and subscription service device is limited, e.g., in environments where only intermittent connections are possible. The predefined connection timeout interval may be chosen in accordance with the respective application. Suitable connection timeout intervals in general depend on the respective application, e.g., type of organization/cooperation, or geolocation. For example, in case that the audio device being a headset, used by outside sales team members of a company, a suitable timeout interval may be three months. For remote working employees in the same scenario, a suitable timeout interval may be one month. In case of external contractors in the preceding scenario, a suitable timeout interval may be one week.

In an additional embodiment, a connectivity reminder is provided to the user according to a given schedule before the expiration of the predefined connection timeout interval. For example, the connectivity reminder may be provided when the remaining time before the predefined connection timeout interval falls below 48 hours.

The connectivity reminder may be provided to inform the user to revalidate her or his subscription in time to avoid the subscription to expire. The expiration reminder in one embodiment may be a voice prompt, stating "Please note that your subscription expires without network connection. Please reconnect the device to the network".

In another embodiment, the connectivity reminder repeated according to a predefined schedule, e.g., every 2 hours, every 30 minutes, every 2 minutes, every 1 minute, or every 30 seconds, depending on the type of audio device. For example, in case of a headset, the schedule generally may be rather short, i.e., every 2 minutes to every 10 seconds. In case of a soundscaping or PA system, the schedule may be, e.g., 30 minutes.

In another alternative or additional embodiment, the connectivity reminder is provided upon every power-up of the audio device when no connection to the subscription service device is given. In another alternative or additional embodiment, the connectivity reminder is provided upon a query of the user, e.g., using a user interface or using voice commands.

According to a further additional or alternative embodiment, the subscription verification module is configured to receive subscription information, comprising subscription expiration data. The subscription verification module may additionally or alternatively be configured to set the subscription state indicator according to the subscription expiration data. The present embodiment also is useful in case the connectivity between the audio device is limited. For example, the subscription verification module may be configured to set the subscription state indicator to the unsubscribed state when the expiration data provides that the subscription has expired. In the present example, the subscription verification module may comprise or be connected to a timer module, allowing to determine when the subscription expires without external connections being required.

Reactivation of the subscription once expired in the present embodiment is possible by reconnecting with the subscription service device. Then, renewed subscription information is provided to the subscription verification module, the latter of which then determines whether to set the subscription state indicator again to the subscribed state.

It is noted that in the above mentioned embodiments, the subscription information certainly may comprise further information, in particular with respect to subscription details of the audio device. Some examples in this regard are given in the preceding.

According to another additional or alternative embodiment, the audio processor of the subscription-enabled audio device is configured to provide an expiration audio output to the speaker. Such an expiration audio output may be useful to inform the user of the expiration of the subscription before it expires.

In one embodiment, the expiration audio output is provided to the user when a predefined expiration threshold is met. The expiration threshold defines a minimum time period to the above mentioned end of the subscription according to the subscription expiration data. In one example, the expiration threshold is 48 hours, i.e., 2 days before the expiration date/time. The user thus has enough time to renew his or her subscription in time before it expires. A corresponding timer module may in this case be formed as part of the audio device to determine the expiration date/time.

The expiration audio output may be provided to inform the user to revalidate her or his subscription in time to avoid the subscription to expire. The expiration reminder in one embodiment may be a voice prompt, stating "Please note that your subscription expires. Please renew timely before . . . ". In another embodiment, the expiration reminder is downloaded from the subscription service device. This allows to customize the reminder, e.g., "Your subscription is about to expire. Please call the facilities department at extension 1234 to renew.".

In another embodiment, once the expiration threshold or the timeout threshold is met, the expiration audio output is repeated according to a predefined schedule, e.g., every 2 hours, every 30 minutes, every 2 minutes, every 1 minute, or every 30 seconds, depending on the type of audio device. For example, in case of a headset, the schedule generally may be rather short, i.e., every 2 minutes to every 10 seconds. In case of a soundscaping or PA system, the schedule may be, e.g., 30 minutes.

In another alternative or additional embodiment, the expiration audio output is provided upon every power-up of the audio device and/or upon a query of the user, e.g., using a user interface or using voice commands.

According to a further alternative or additional embodiment, the expiration audio output and/or the connectivity reminder is provided upon detection of the audio device being worn. The present embodiment may be particularly useful in case the audio device is provided as a headset or as headphones, for example. To determine the audio device being worn, a suitable sensor may be provided as part of the audio device, e.g., a capacitive or light sensor.

According to a further alternative or additional embodiment, the audio processor is configured to provide subscription initiation audio output to the speaker in case the audio device is not configured.

The present embodiment provides the automatic playback of instructions to the user when the audio device is not configured, such as upon initial power-up or upon a reset of the device.

The subscription initiation audio output according to the present embodiment may be of any suitable type to guide the user to activate the subscription and may be customized to the respective application. For example, an audio prompt may provide the user with information that the audio device is in need of a subscription and on how to proceed with the correspondingly needed configuration. Once the device is successfully enrolled, i.e., has a current subscription, the subscription initiation audio output certainly is not repeated.

The customized subscription initiation audio output in one embodiment may be pre-programmed into the audio processor and/or the subscription verification module. In another embodiment, the subscription initiation audio output is provided by the subscription service device upon initialization of the audio device.

A customized subscription initiation audio output may be beneficial to allow a personalized "out of box experience", for example for the respective organization/corporation.

According to another alternative or additional embodiment, the audio device is a head-worn audio device.

The head-worn audio device may be of any suitable type and may certainly comprise one or more additional components. The term "head-worn audio device", also referred to as "head mounted wearable audio device" or "head-wearable audio device", in this context is understood to refer to an audio device, which is configured to at least during use be worn on or attached to the user's head and/or neck.

For example, the head-worn audio device may be provided as or be integrated with a head mounted display, glasses, a hat, or a headset.

In one embodiment, the head-worn device may be battery powered and at least during use cordless.

According to another alternative or additional embodiment, the audio device is a headset.

In this context, the term "headset" comprises all types of headsets, headphones, and other head-worn audio playback devices, such as for example circumaural and supra-aural headphones, ear buds, in-ear headphones, and other types of earphones. The headset can be of mono, stereo, or multi-channel setup.

The headset in further embodiments certainly may comprise additional components. For example, the headset in one exemplary embodiment may comprise one or more of a microphone to obtain user audio, control electronics to process audio, a wireless communications interface, and a battery.

According to a second exemplary aspect, a subscription system with at least an audio device and a subscription service device is provided.

According to the present aspect, the at least one audio device comprises at least a speaker for providing an application audio output, a subscription verification module, allowing to determine a subscription state indicator, a communication interface, connected with the subscription verification module and configured at least for communication with a subscription service device, and an audio processor for controlling the speaker. The audio processor is configured to query the subscription verification module to obtain the subscription state indicator and to provide a subscription state audio output in addition to said application audio output to the speaker in case the subscription state indicator corresponds to an unsubscribed state.

The subscription service device comprises at least a second communication interface, configured for communication with the at least one audio device, and a subscriber database, connected with the second communication interface to provide subscription information to the at least one audio device. Certainly, both, the audio device, and the subscription service device may comprise additional components, such as in particular a processor, a suitable housing, and power supply.

The audio device and/or the subscription service device according to the present aspect and in further embodiments may be configured according to one or more of the embodiments, discussed in the preceding with reference to the preceding aspect.

In addition, it is noted that the subscription service device, besides the management of the device subscriptions—also referred to as "device licenses" or "device leases"- and in corresponding embodiments may provide additional service layers, and for example may be configured to provide configuration settings to the audio device(s). In another additional or alternative example, the subscription service device may be configured with a billing module to automatically arrange payments when a subscription is initiated or renewed.

According to yet another exemplary aspect, a computer-implemented method of subscription management with an audio device is provided. The audio device having at least a speaker for providing an application audio output and an audio processor for controlling the speaker. According to the present method, a subscription state indicator is obtained, and in case the subscription state indicator corresponds to an unsubscribed state, a subscription state audio output is provided together with the application audio output to the speaker.

The audio device according to the present aspect and in further embodiments may be configured according to one or more of the embodiments, discussed in the preceding with reference to the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a schematic block diagram of a subscription-enabled audio device 1, namely a headset. Audio device 1 is adapted for audio playback and correspondingly comprises two headphone-speakers 2a and 2b. The speakers are connected with an audio processor 3 over an amplifier circuit (not shown), which provides drive signals for the speakers 2a and 2b. The drive signals are generated by the audio processor 3, as will be explained in more detail in the following description.

Audio processor 3 furthermore is connected to a dynamic microphone array 4 to obtain user audio, to DRAM memory 6, and to microcontroller 5 for digital audio data I/O and to receive control commands. According to the present embodiment, audio processor 3 is a mixed-signal digital signal processor (DSP), available from ON Semiconductor, 5005 East McDowell Road Phoenix, Ariz., USA as "Belasigna 200". Alternatively, a DA14195 low-power SoC DSP, available from Dialog Semiconductor, 100 Longwater Avenue, Reading, United Kingdom, may be used.

The subscription-enabled audio device 1 according to the present example further comprises a Bluetooth interface 7 with a corresponding antenna, as well as a battery 8. So as not to obscure the FIGS. unnecessarily, power connections between battery 8 and the further components of audio device 1 are not shown.

Bluetooth interface 7 is connected with microcontroller 5 to exchange digital audio data and to conduct configuration and management routines, such as the typical device pairing according to the Bluetooth low energy specification, but also to configure subscription verification module 9. In particular, a subscription state indicator, stored in subscription verification module 9.

The subscription state indicator of subscription verification module 9 allows to determine, whether the audio device 1 is under a current subscription, making the audio device 1 usable for Device-as-a-Service (DaaS) or subscription applications, as will be explained in the following in more detail.

Figure 2:
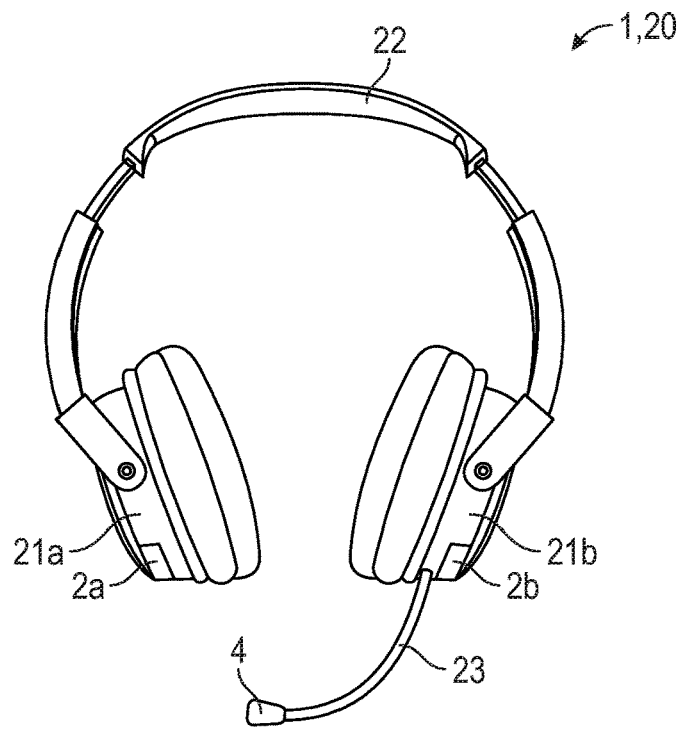
FIG. 2 shows a schematic front view of the audio device of FIG. 1.

FIG. 2 shows a schematic front view of audio device 1, which, as discussed in the preceding, is a headset 20. The headset 20 comprises two earphone housings 21a, 21b, which are connected via head band 22. Each earphone housing 21a, 21b comprises a speaker (driver) 2a, 2b. Microphone array 4 is mounted on boom 23. All further components, discussed in the preceding with reference to FIG. 1, are comprised on a logic board (not shown), arranged in housing 21b.

In the following, operation of audio device 1 will be explained with reference to a subscription system 30, which additionally comprises a subscription service device 31 and a user computing unit 32. A schematic block diagram of an embodiment of subscription system 30 is shown in FIG. 3.

Figure 3:
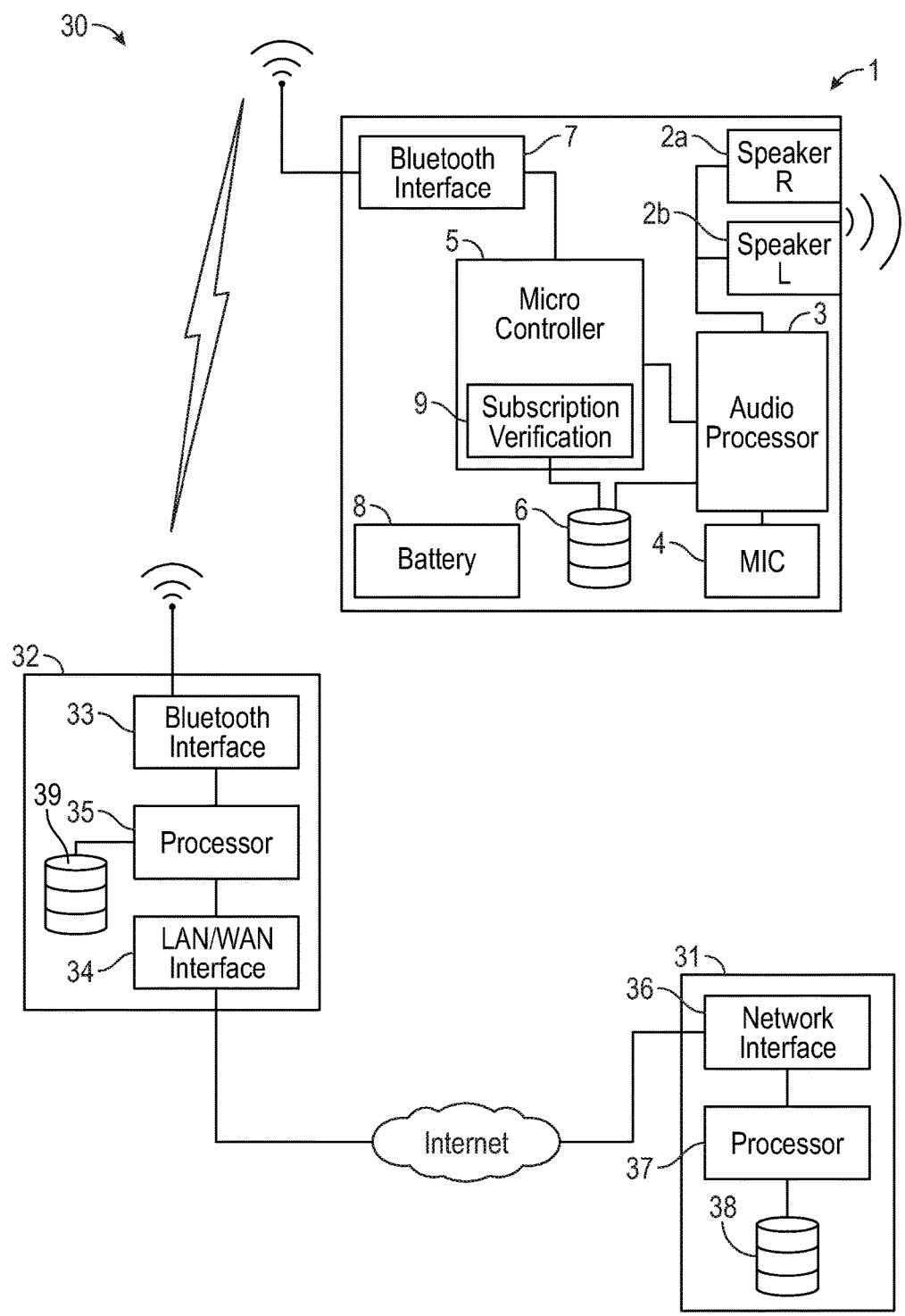
FIG. 3 shows a schematic block diagram of an embodiment of a subscription system with the exemplary audio device of FIGS. 1 and 2.

As can be seen from FIG. 3, audio device 1 is in wireless communication with user computing unit 32 using Bluetooth interfaces 7, 33. User computing unit 32 according to the present embodiment is a typical desktop computer, running teleconferencing software. Bluetooth interface 33 of the user computing unit 32 is connected to a processor 35, which in turn is connected with a LAN/WAN interface 34. It is noted that user computing unit 32 may comprise additional components, such as in particular memory 39, various bus connections, and a power supply unit, which however are not described in detail in the present explanation.

User computing unit 32 is connected to subscription service device 31 over the Internet. Subscription service device 31 according to the present embodiment corresponds to a remote "cloud server" and comprises a corresponding network interface 36, a processor 37, and memory 38 comprising a subscriber database.

The subscriber database comprises information pertaining to the subscription status of every audio device 1 in the subscription system 30 including a unique audio device ID, subscription status, and subscription expiration date. An excerpt from an exemplary subscriber database is shown below:

| User ID | Device ID | Subscription active? | Subscription expires on |
|---|---|---|---|
| Company A | 128465 | Yes | Dec. 4, 2016 |
| Company A | 128466 | Yes | Dec. 4, 2016 |
| Company A | 128467 | Yes | Dec. 4, 2016 |
| Company A | 128468 | Yes | Dec. 4, 2016 |
| Company B | 198554 | No | — |
| Company B | 198555 | No | — |
| Individual C | 215118 | Yes | Aug. 29, 2017 |

Figure 4A:
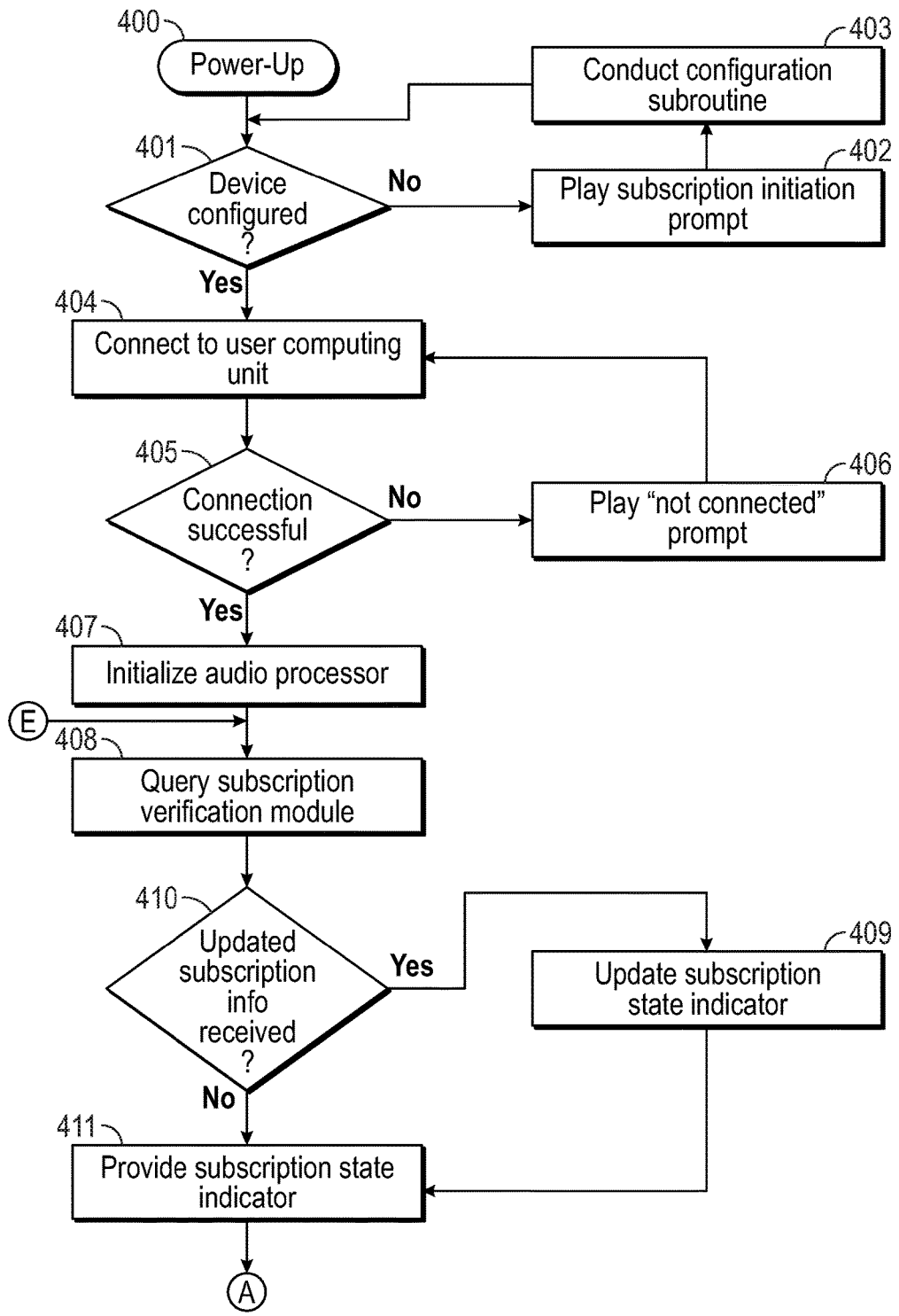
FIGS. 4A-4C show an example of the operation of audio device according to FIGS. 1-3 in a schematic flow chart.
Figure 4B:
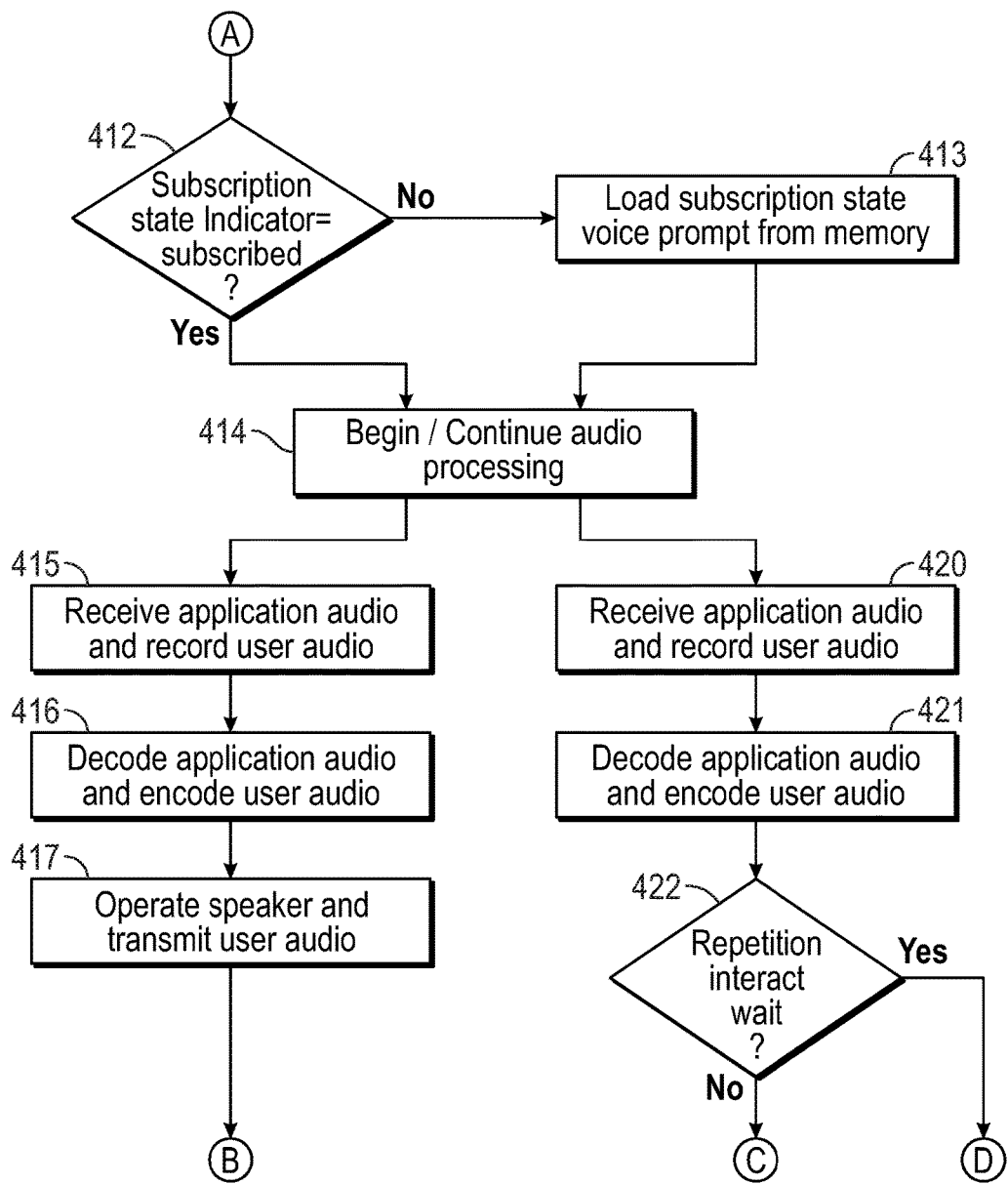
Figure 4C:
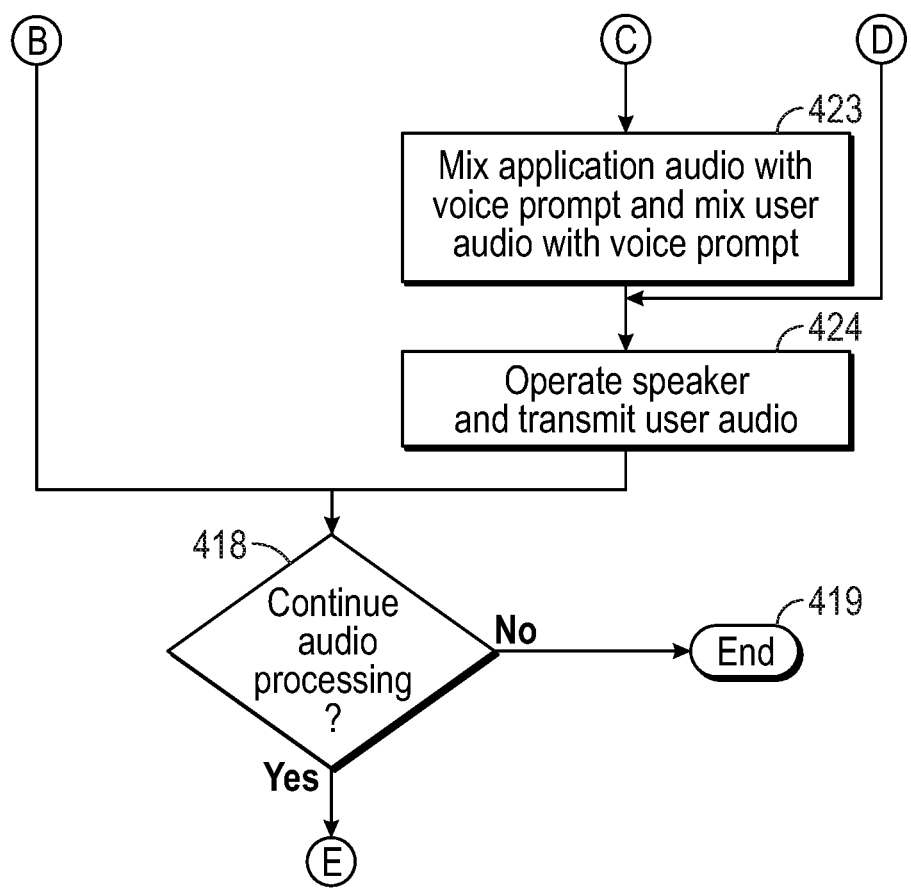

FIGS. 4A-4C show an example of the operation of audio device 1 according to FIGS. 1-3 in a schematic flow chart. The operation of audio device 1 begins in step 400 with the power up of the device 1, such as when the user activates a corresponding power button of a user interface (not shown in the FIGS.).

In step 401, the microcontroller 5 of audio device 1 determines, whether the device already is configured for operation within subscription system 30 or whether it is not configured, such as a factory new device. If the device is not configured yet, a corresponding voice prompt is provided in step 402 providing the user with information on Bluetooth pairing so that a connection is setup between audio device 1 and computing unit 32. Subsequently, a configuration subroutine is conducted in step 403. In the configuration subroutine, audio device 1 communicates with user computing unit 32 to obtain configuration parameters, including audio settings, and subscription information. The subscription information is obtained from subscription service device 31 through a client program, installed on user computing unit 32.

In case the audio device 1 is configured, the microcontroller 5 tries to connect to the user computing unit 32 via Bluetooth interface 7 in step 404. Certainly and in case that the configuration subroutine 403 was conducted shortly before, a connection may already be established. In step 405, the microcontroller 5 after a communication timeout of 20 seconds determines, whether the connection attempt was successful. If this is not the case, a corresponding voice prompt is played over speakers 2a and 2b that informs the user of the unsuccessful attempt. A further connection attempt is then conducted in step 404.

In case of a connection between audio device 1 and user computing unit 32, i.e., between Bluetooth interface 7 of audio device 1 and of Bluetooth interface 33 of user computing unit 32, the audio processor 3 is initialized in step 407. Necessary configuration parameters are loaded during this step from memory 6, e.g., codecs used for the digital audio transmission, bitrates, etc.

In step 408, the audio processor 3 queries the subscription verification module 9 for the current subscription state indicator. This step triggers a determination by the subscription verification module 9 in step 410, whether updated subscription information has been received from the subscription service device 31 since the last time that the determination was conducted in step 410. In the present embodiment, the subscription service device 31 operates in a "push"-mode and provides new subscription information to the audio device 1 if necessary, such as in case of a change in the subscription status of the respective device.

If new subscription information has been received in the meantime, subscription verification module 9 in step 409 updates the subscription state indicator accordingly. The current subscription state indicator is in any case provided to the audio processor 3 by the subscription verification module 9 in step 411.

As can be seen from FIG. 4B and in step 412, the audio processor 3 determines, whether the audio device 1 currently is under an active subscription or whether it is unsubscribed.

In the following explanation of the present embodiment, it is assumed that the user "Company A" has an active subscription for device ID 128465, i.e., the present audio device 1, according to the above excerpt from an exemplary subscriber database. During the conduction of the configuration subroutine, the client program of user computing unit 32 obtains the following subscription information from the subscription service device 31, which is then passed to subscription verification module 9:

| Device ID | Subscription active? |
|---|---|
| 128465 | Yes |

Since the subscription state indicator thus indicates a subscribed state, the process is continued directly with step 414 with the beginning of the audio processing by audio processor 3. While the following steps are discussed with respect to functionality conducted, it should be clear that typical audio processors 3 process digital audio data streams bit- or block-wise in a continuous and parallel manner. Accordingly, it is noted that the block diagram of FIGS. 4A-4C serves as a simplified illustration of the processing of a finite block of audio data, e.g., some milliseconds.

In step 415, the audio processor 3 receives digital application audio data from the user computing unit 32 over Bluetooth interfaces 7, 33. The application audio data in this embodiment is incoming audio from a teleconferencing application. In parallel thereto, audio processor 3 records user audio from microphone array 4. The application audio data is then decoded in step 416 according to the respective audio codec used to obtain an application audio output. The user audio is correspondingly in parallel thereto encoded to obtain digital user audio data. According to the present embodiment, both, the application audio data and the user audio data is in SBC format.

In step 417, the application audio output is provided to the speakers 2a, 2b via the integrated amplifier. In parallel thereto, the digital user audio data is transmitted to user computing unit 32, again using the Bluetooth interfaces 7, 33.

As can be seen from FIG. 4C, in step 418 it is determined whether the user wishes to continue with the audio processing. For example, in case the user requested power-off of the audio device 1 or ended the teleconference on user computing unit 32, the operation ends in step 419. Otherwise, the operation continues with step 408 and a further query of the subscription verification module 9 by the audio processor 3.

In case the user terminates the subscription of the current device no. 128465, updated subscription information is send to the audio device 1 by the subscription service device 31. The determination, whether updated subscription information is received in step 410 then concludes positive. Accordingly, the subscription state indicator is updated in step 409 and consequently provided to the audio processor in step 411. The subscription state indicator now corresponds to an unsubscribed state, which causes the audio processor to load a subscription state audio output from memory 6 in step 413.

According to the present embodiment, the subscription state audio output is a voice prompt, which informs the user that his or her subscription is expired. The audio processing is continued in step 414. Corresponding to step 415 and as discussed in the preceding, in step 420 the audio processor 3 receives digital application audio data from the user computing unit 32 over Bluetooth interfaces 7, 33. In parallel thereto, audio processor 3 records user audio from microphone array 4. The decoding/encoding of digital audio data in step 421 corresponds to step 416, also discussed in the preceding.

In step 422, the audio processor 3 determines, whether a repetition interval counter is active. In the present example, this is not the case and the procedure continues with step 423. Here, the subscription state audio output is mixed to the application audio output. Simultaneously, the subscription state audio output is also mixed to the user audio data.

In step 424, the application audio output is provided to the speakers 2a, 2b via the integrated amplifier. In parallel thereto, the digital user audio data is transmitted to user computing unit 32, again using the Bluetooth interfaces 7, 33.

Differing from the above, both, the audio output of the speakers 2a, 2b, and the user audio data, provided to the teleconferencing software, now comprise the subscription state voice prompt, i.e., an overlay, to inform the participating users that the subscription of audio device 1 has expired, while keeping the main functionality of the audio device 1, i.e., in this example, still allowing communication.

As discussed in the preceding, the audio processor 3 in step 422 determines, whether a repetition interval counter is active. The counter provides that the voice prompt is only provided in predefined intervals, e.g., every 5 minutes to limit its interference with the main function of audio device 1. The repetition interval counter accordingly is set, once the voice prompt is mixed into the audio as discussed above and provides that no further voice prompt is mixed into the audio signals for the next five minutes.

Figure 5A:
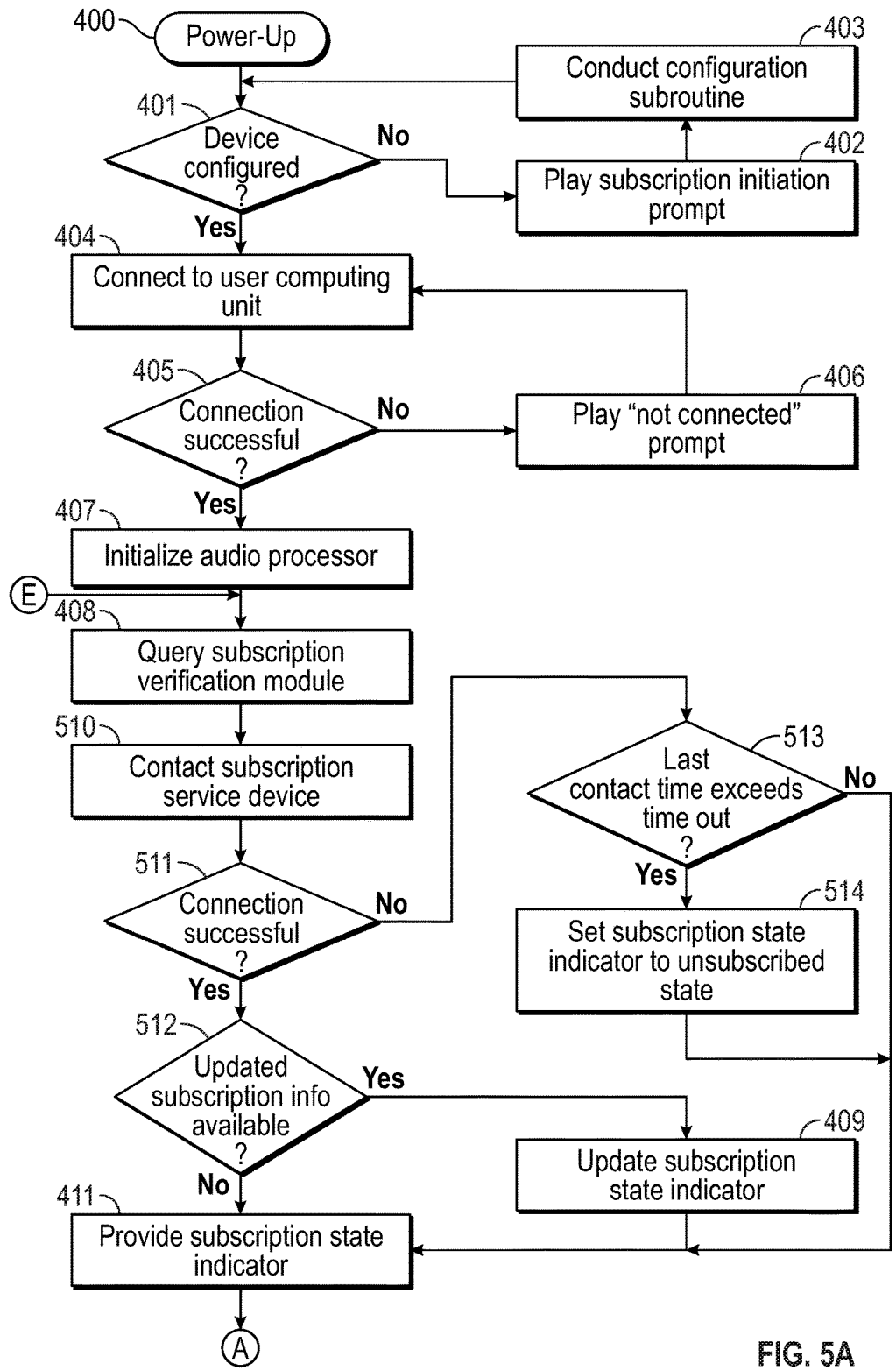
FIGS. 5A-5C show another embodiment of the operation of audio device 1 according to FIGS. 1-3 in a schematic flow chart.
Figure 5B:
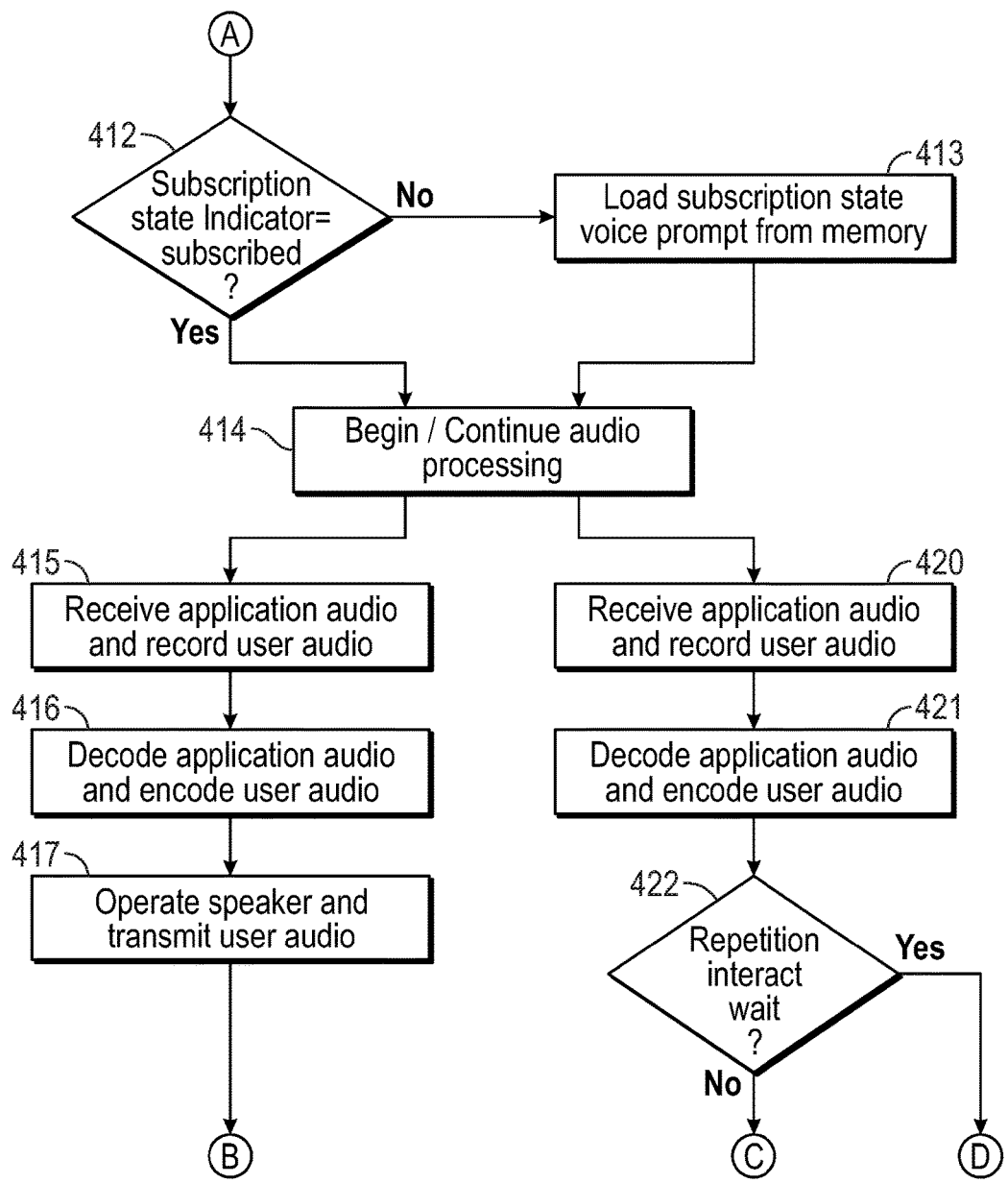
Figure 5C:
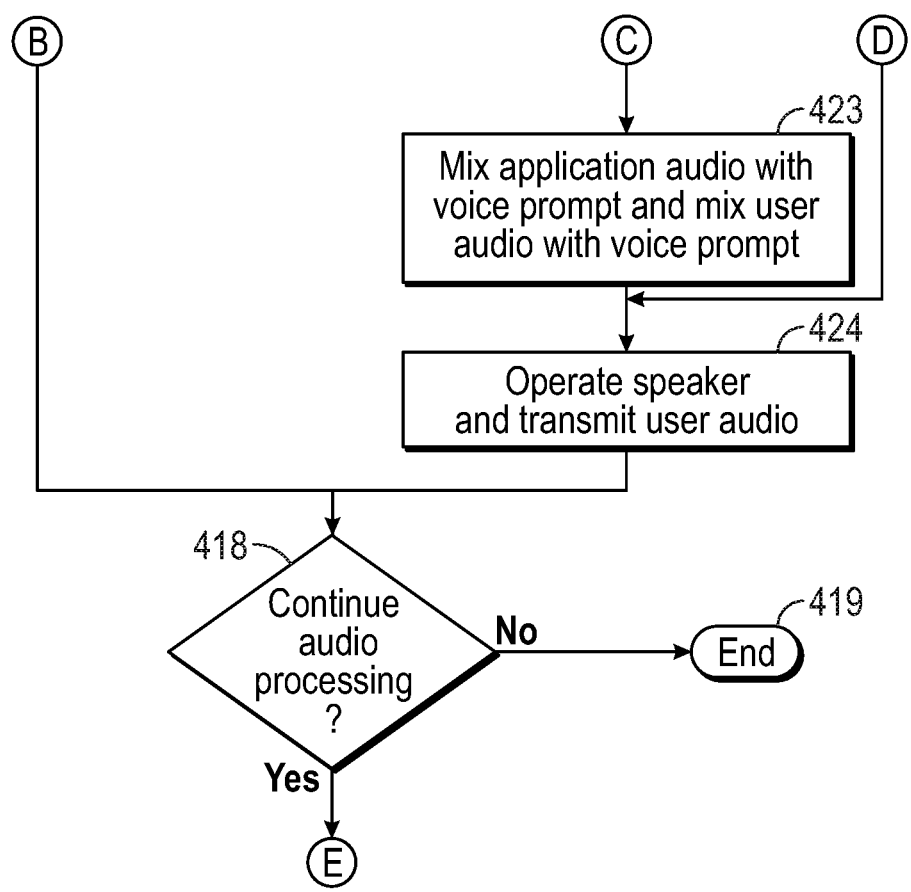

FIGS. 5A-5C show another embodiment of the operation of audio device 1 according to FIGS. 1-3 in a schematic flow chart. The operation in the present embodiment corresponds to the operation in the embodiment discussed in the preceding with reference to FIGS. 4A-4C with the exception of steps 510-514. While in the embodiment of FIGS. 4A-4C, the subscription service device 31 operates in a push-mode and actively distributes subscription information to the audio device 1 upon a change, in the embodiment of FIGS. 5A-5C, the subscription verification module 9 in step 510 attempts to connect to the subscription service device 31. In step 511, the subscription verification module 9 determines, whether a connection to subscription service device 31 was established successfully. If this is the case, the subscription verification module 9 in step 512 queries the subscription service device 31 for updated subscription information. In case updated subscription information is available, the locally stored subscription state indicator is updated in step 409 according to the new subscription information. Otherwise, the operation continues with step 411 as explained in the preceding with reference to FIGS. 4A-4C.

In case no connection with the subscription service device 31 could be established in step 510, the subscription verification module 9 determines in step 513 whether the time since the last contact to subscription service device 31 exceeds a predefined connection timeout interval. In the present embodiment, the connection timeout interval is set to two weeks. If this timeout interval is exceeded, the subscription state indicator is set to the unsubscribed state in step 514. In both cases, i.e., in case the predefined connection timeout interval is exceeded and in case it is not exceeded, the operation then continues with step 411 as discussed in the preceding.

Figure 6A:
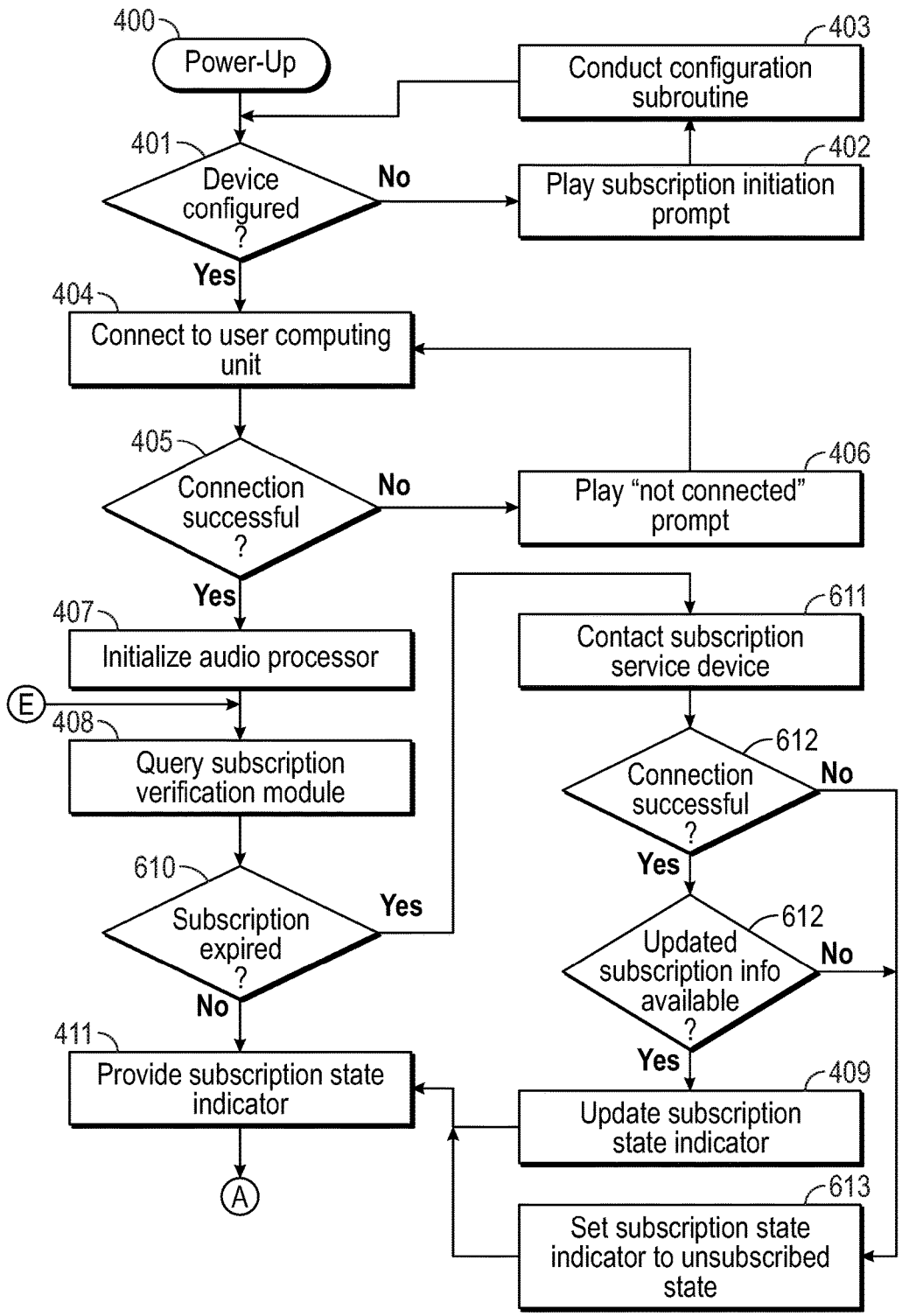
FIGS. 6A-6C show another embodiment of the operation of audio device 1 according to FIGS. 1-3 in a schematic flow chart.
Figure 6B:
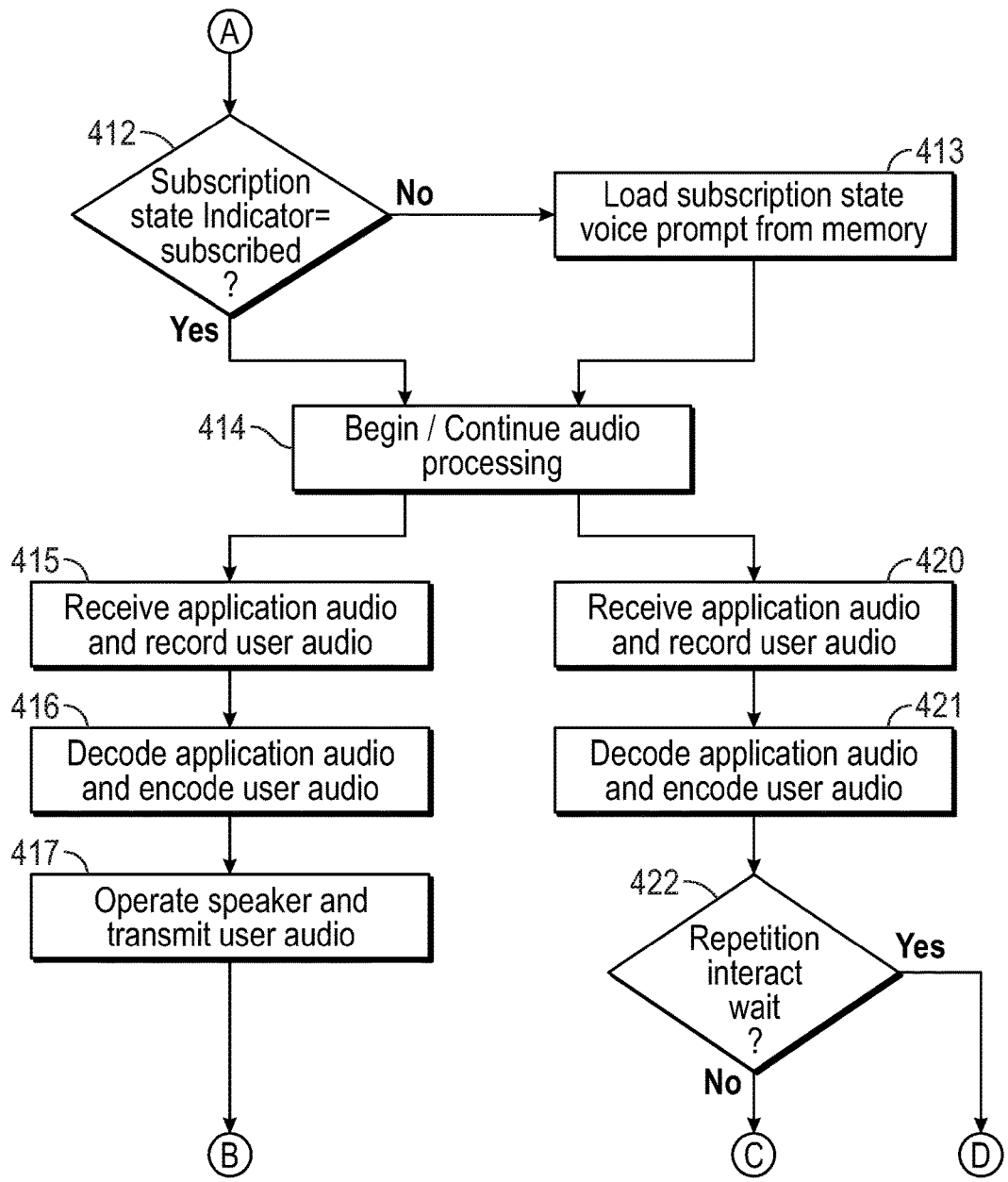
Figure 6C:
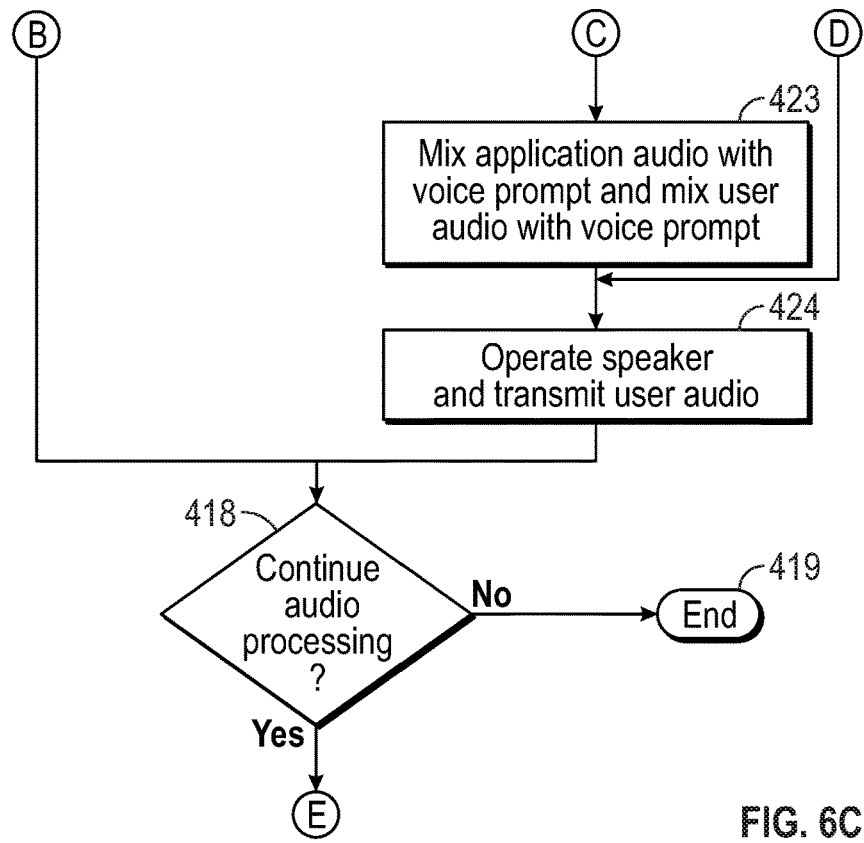

FIGS. 6A-6C show another embodiment of the operation of audio device 1 according to FIGS. 1-3 in a schematic flow chart. The operation in the present embodiment corresponds to the operation in the embodiment discussed in the preceding with reference to FIGS. 4A-4C with the following exceptions.

According to the present embodiment, the subscription information obtained in the configuration subroutine of step 403 comprises subscription expiration data, which in this example is the date/time when the subscription expires.

Instead of the operation of step 410, discussed in the preceding with reference to FIGS. 4A-4C, in the present embodiment, the subscription verification module 9 in step 610 determines, whether the subscription has expired by comparing the present date and time of a clock module of microcontroller 5 (not shown) with the date and time of the subscription expiration data. In case the subscription expiration date/time has not been reached, the operation continues with step 411 as discussed in the preceding with reference to FIGS. 4A-4C. Otherwise, the subscription verification module 9 in step 611 tries to connect to subscription service device 31. If in step 612, it is determined that the subscription service device 31 could not be contacted successfully, the subscription state indicator is set to the unsubscribed state in step 613. Again, the operation then continues with step 411 as discussed before.

In case a connection to subscription service device 31 could be established, the subscription verification module 9 in step 612 determines, whether updated subscription information is available from subscription service device 31. This could be the case, e.g., if the user in the meantime has renewed his or her subscription. If available, the subscription state indicator is updated accordingly in step 409. Otherwise, the operation continues with step 613.

Figure 7:
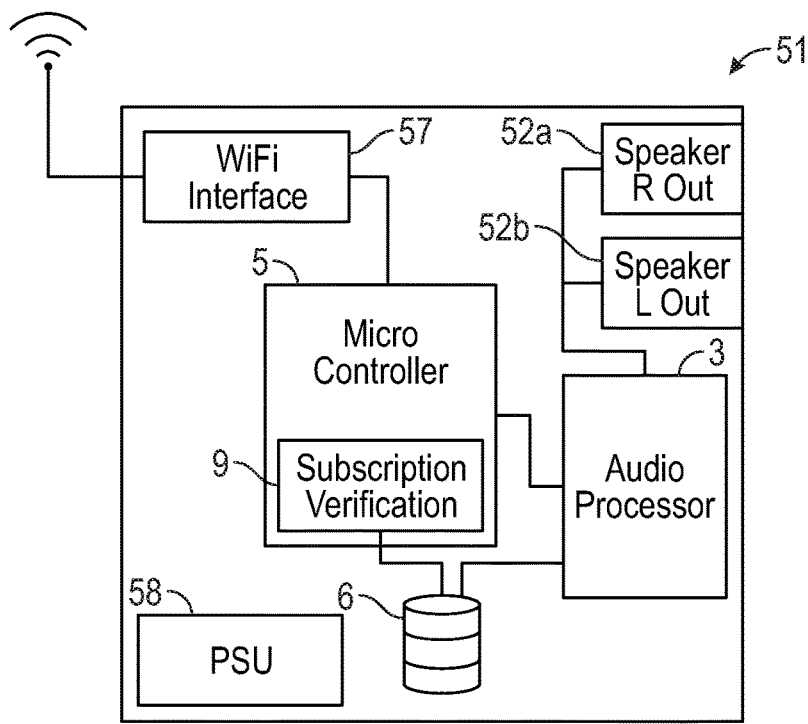
FIG. 7 shows a schematic block diagram of a further embodiment of a subscription-enabled audio device.

FIG. 7 shows a schematic block diagram of further embodiment of a subscription-enabled audio device 51. The embodiment corresponds to the embodiment of FIG. 1 with the following exceptions. Audio device 51 is a PA (public address) type in-room audio device that is used in a subscription system. Instead of Bluetooth interface 7, audio device 51 comprises a Wi-Fi interface 57 to connect to a network. In view of the fact that in-room audio devices are typically installed in a fixed position, audio device 51 comprises a power supply unit 58 instead of battery 8.

Audio processor 3 of audio device 51 according to the present embodiment is configured to provide an application audio output to external speakers. Accordingly, instead of internal speakers 2a, 2b, corresponding speaker outputs 52a, 52b are arranged, which provide line audio signals. The application audio output is generated by the audio processor 3 from audio data, stored in memory 6. In the present embodiment, the PA system is used in a sound masking/soundscaping application. Here, the audio data comprises white noise, which is known to suppress typical room noise, such as in office spaces.

In addition to the above, audio device 51 does not comprise a microphone. Accordingly, audio processor 3 according to this embodiment does not provide user audio data over Wi-Fi interface 57.

Figure 8:
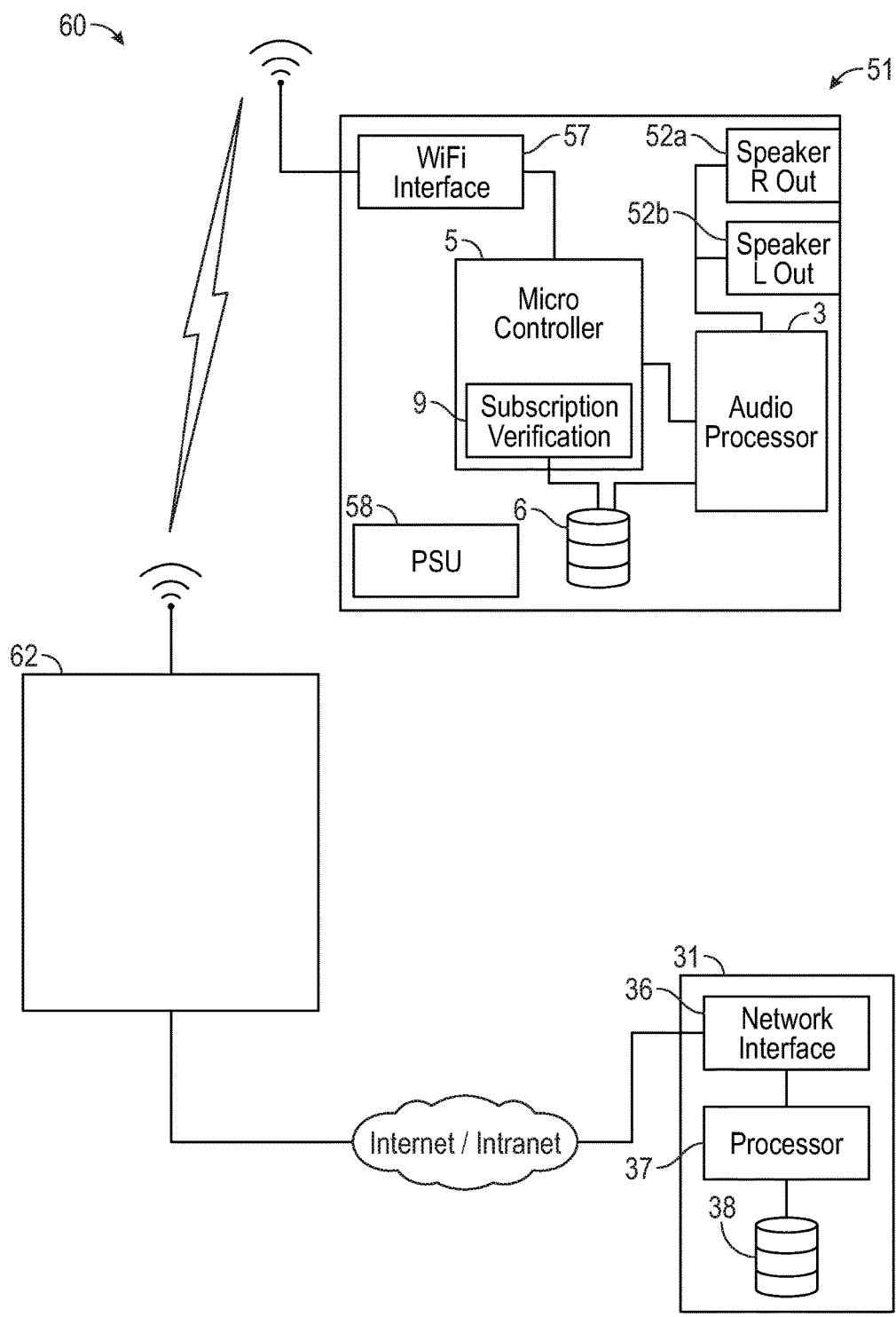
FIG. 8 shows a schematic block diagram of a further embodiment of a subscription system with the exemplary audio device of FIG. 7.

FIG. 8 shows a schematic block diagram of a further embodiment of a subscription system 60 with the exemplary audio device 51 of FIG. 5. As can be seen from FIG. 6, audio device 51 is connected via Wi-Fi to a Wi-Fi access point 62. The Wi-Fi access point 62 connects to subscription service device 31 via corresponding cable connections, as described with reference to the preceding embodiments. It is noted that in subscription system 60, audio device 51 is directly connected with subscription service device 31, i.e., no user computing device is provided in this embodiment.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein

- instead of microphone array 4, a single microphone is used,
- interfaces 7, 33, instead of using the Bluetooth low energy protocol, use the Bluetooth BR/EDR protocol, ZigBee protocol, Wi-Fi/IEEE 802.11 protocol, DECT protocol, or an NFMI (near field communication protocol),
- audio device 1 is configured for conductor based/corded operation, instead of, or additional to wireless communication using interface 7, 57, such as using an Ethernet connection,
- audio device 1, 51 comprises an audio input unit, connectable with an audio source over a conductor based connection,
- audio device 1, 51, instead of being configured for stereo operation, is configured for mono operation or for multichannel operation,
- audio device 1, instead of being connected with subscription service device 31 over user computing unit 32, being connected with subscription service device 31 directly or over one or more intermediate audio devices 1, e.g., in a mesh-type network setup,
- subscription service device 31, instead of corresponding to a remote "cloud server", is formed integrally with a user computing unit, a mobile phone, a tablet computer, a headset hub, or a suitable type of non-audio device, in the embodiment of FIGS. 5A-5C, a connectivity reminder is provided to the user according to a given schedule before the expiration of the predefined connection timeout interval, the audio processor of the subscription-enabled audio device is configured to provide an expiration audio output to the speaker, e.g., to inform the user of the expiration of the subscription before it expires, computing unit 32, instead of a desktop computer, is a smartphone, tablet, smart watch, or a gaming console; and/or instead of LAN/WAN interface 34 being connected with network interface 36 over the Internet, the interfaces 34, 36 being connected over a wired or wireless local area network.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A subscription-enabled audio device, comprising at least
   a speaker for providing an application audio output;
   a subscription verification module, allowing to determine a subscription state indicator; and
   an audio processor for controlling the speaker, wherein the audio processor is configured to query the subscription verification module to obtain the subscription state indicator and, in case the subscription state indicator corresponds to an unsubscribed state, to provide a subscription state audio output in addition to said application audio output to the speaker; wherein
   the subscription state audio output is multiplexed with the application audio output.

2. The audio device of claim 1, further comprising a communication interface, connected with the subscription verification module and configured at least for communication with a subscription service device.

3. The audio device of claim 2, wherein the communication interface is additionally configured to receive application audio data and to provide the received application audio data to the audio processor for generating the application audio output.

4. The audio device of claim 2, wherein the subscription verification module is configured to receive subscription information from a subscription service device and to set the subscription state indicator corresponding to the received subscription information.

5. The audio device of claim 2, wherein the subscription verification module is configured to set the subscription state indicator to the unsubscribed state in case subscription information is not received from a subscription service device within a predefined connection timeout interval.

6. The audio device of claim 1, wherein the audio processor is configured not to provide the subscription state audio output to the speaker in case the subscription state indicator corresponds to a subscribed state.

7. The audio device of claim 1, wherein the audio processor is configured to repeat the subscription state audio output until the subscription state indicator corresponds to the subscribed state.

8. The audio device of claim 1, wherein the audio processor is configured to repeat the subscription state audio output in periodic intervals.

9. The audio device of claim 1, wherein the subscription state audio output is a voice prompt.

10. The audio device of claim 1, further comprising a user audio input to obtain user audio.

11. The audio device of claim 10, wherein the audio processor is connected with the user audio input and being configured to provide user audio data to the communication interface for transmission to a further device, wherein in case the subscription state indicator corresponds to the unsubscribed state, the audio processor is configured to generate the user audio data from the user audio and the subscription state audio output.

12. The audio device of claim 1, wherein the subscription verification module is configured to receive subscription information, comprising subscription expiration data, and to set the subscription state indicator according to the subscription expiration data.

13. The audio device of claim 1, wherein the audio processor is configured to additionally provide an expiration audio output to the speaker.

14. The audio device of claim 1, wherein the audio processor is configured to provide subscription initiation audio output to the speaker in case the audio device is not in a configured state.

15. The audio device of claim 1, wherein the audio device is head-worn user audio device.

16. The audio device of claim 1, wherein the audio device is a headset.

17. The audio device of claim 1, wherein the subscription state indicator relates to the subscription state of the audio device itself.

18. The audio device of claim 1, wherein the audio device remains mainly functional, even when no current subscription is present.

19. A subscription system with at least one audio device and a subscription service device,
   the audio device comprising at least
      a speaker for providing an application audio output;
      a subscription verification module, allowing to determine a subscription state indicator;
      a communication interface, connected with the subscription verification module and configured at least for communication with a subscription service device; and
      an audio processor for controlling the speaker; and
   the subscription service device comprising at least
      a second communication interface, configured for communication with the at least one audio device; and
      a subscriber database, connected with the second communication interface to provide subscription information to the at least one audio device;
   wherein
      the audio processor of the audio device is configured to query the subscription verification module to obtain the subscription state indicator and, in case the subscription state indicator corresponds to an unsubscribed state, to provide a subscription state audio output in addition to said application audio output to the speaker;

wherein the subscription state audio output is multiplexed with the application audio output.

20. The subscription system according to claim 19, having a plurality of audio devices.

21. A computer-implemented method of subscription management with an audio device, the audio device having at least a speaker for providing an application audio output, wherein a subscription state indicator is obtained; and in case the subscription state indicator corresponds to an unsubscribed state, a subscription state audio output is provided together with the application audio output to the speaker;

wherein the subscription state audio output is multiplexed with the application audio output.

22. A non-transitory machine-readable recording medium including contents that are configured to cause an audio device to conduct the method of claim 21.

* * * * *